United States Patent
Sugita (10) Patent No.: US 7,965,731 B2
(45) Date of Patent: Jun. 21, 2011

(54) COMMUNICATION APPARATUS AND COMMUNICATION METHOD

(75) Inventor: Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 12/117,528

(22) Filed: May 8, 2008

(65) Prior Publication Data

US 2008/0285585 A1   Nov. 20, 2008

(30) Foreign Application Priority Data

May 18, 2007  (JP) ................. 2007-132722

(51) Int. Cl.
*H04L 12/28* (2006.01)
(52) U.S. Cl. ...................... 370/431; 370/459
(58) Field of Classification Search .............. None
See application file for complete search history.

(56) References Cited

U.S. PATENT DOCUMENTS

| | | | | |
|---|---|---|---|---|
| 5,596,439 A | * | 1/1997 | Dankberg et al. | 398/35 |
| 2005/0243765 A1 | * | 11/2005 | Schrader et al. | 370/328 |
| 2007/0025384 A1 | * | 2/2007 | Ayyagari et al. | 370/445 |
| 2007/0286130 A1 | * | 12/2007 | Shao et al. | 370/336 |
| 2008/0095123 A1 | * | 4/2008 | Kuroda et al. | 370/336 |
| 2008/0232270 A1 | * | 9/2008 | Fleming et al. | 370/254 |

FOREIGN PATENT DOCUMENTS

| | | |
|---|---|---|
| JP | 2000-078668 | 3/2000 |
| JP | 2007-019618 | 1/2007 |
| JP | 2007-116478 | 5/2007 |
| WO | 2007/034854 | 3/2007 |
| WO | 2007/040203 | 4/2007 |
| WO | 2007/114169 | 10/2007 |

OTHER PUBLICATIONS

"High-speed Power Line Communication," Nikkei Business Publications, Inc., Jul. 20, 2006, pp. 64-65.
Japanese Office Action issued on Feb. 3, 2009, for corresponding Japanese Patent Application JP 2007-132722.
CEPCA document dated Apr. 5, 2006, CEPCA Technical Work Group.

* cited by examiner

*Primary Examiner* — Kevin C Harper
(74) *Attorney, Agent, or Firm* — K&L Gates LLP (57) ABSTRACT

A communication apparatus is provided. The communication apparatus includes a first unit for performing data communication using a bandwidth reservation type transmission area constituted by a plurality of time-divided time slots via a power line to which an alternating-current voltage is supplied. A second unit is connected to the first unit, for securing a vacant time slot out of the plurality of time-divided time slots. A third unit is connected to the first unit, for securing a time slot out of the plurality of time-divided time slots when incapable of securing the vacant time slot, the secured time slot being used in common by a first communication system used by the communication apparatus and a second communication system different from the first communication system, the second communication system using the same communication procedure as the first communication system.

14 Claims, 6 Drawing Sheets

COMMUNICATION APPARATUS AND COMMUNICATION METHOD

CROSS REFERENCES TO RELATED APPLICATIONS

The present application claims priority to Japanese Patent Application JP 2007-132722 filed in the Japanese Patent Office on May 18, 2007, the entire contents of which is being incorporated herein by reference.

BACKGROUND

The present disclosure relates to a communication apparatus such as a power line communication modem used for power line communication in which data communication is performed using an indoor power line and its communication method.

Power line communication modems used in this type of field use several communication procedures. When communication procedures are different, they cannot coexist, for example, in one and the same house. The use of modems using different communication procedures in one and the same house is expected in future, and therefore formulation of a coexistence procedure has been awaited.

In FIG. 3 of page 65 of "High-speed Power Line Communication (issued by Nikkei Business Publications, Inc., 20 Jul. 2006)," an example in which a plurality of TDMA slots are each used by different systems, a "system 1", a "system 2", ..., is shown.

One TDM unit in a power line communication procedure under study is constituted by a fixed-length time slot for best-effort type transmission and, for example, four fixed-length time slots for bandwidth reservation type transmission. The power line communication procedure includes a TDMA procedure and a CSMA procedure, and the former is assigned to the bandwidth reservation type time slot, whereas the latter is assigned to the best-effort type time slot.

When the TDMA procedure is adopted, a Beacon signal is transmitted at regular intervals and the interval is time-divided to perform data transmission. One system constituted by a Master and a plurality of slaves is assigned to the bandwidth reservation type time slot. One system uses one or a plurality of time slots according to a necessary transmission speed.

Incidentally, when data to be transmitted does not exist in a system using the TDMA procedure, only the Beacon signal is repeatedly transmitted. The Beacon signal is a transmission indispensable to the system using the TDMA procedure and therefore cannot be stopped. Hence, even when there is no data to be transmitted, the bandwidth reservation type slot continues being used to transmit the Beacon signal. Accordingly, in the case of the above example, up to four systems can coexist, and more than four systems cannot coexist.

In view of the above circumstances, it is desirable to provide a communication apparatus and a communication method capable of relaxing the numerical restriction of systems which can coexist.

SUMMARY

According to an embodiment, there is provided a communication apparatus including: a means for performing data communication using a bandwidth reservation type transmission area constituted by a plurality of time-divided time slots via a power line to which an alternating-current voltage is supplied; a means for securing a vacant time slot out of the plurality of time-divided time slots; and a means for securing a time slot out of the plurality of time-divided time slots when incapable of securing the vacant time slot, the secured time slot being used in common by a first communication system used by the communication apparatus and a second communication system different from the first communication system, the second communication system using the same communication procedure as the first communication system.

In the embodiment, a time slot is secured out of the plurality of time-divided time slots when incapable of securing the vacant time slot, the secured time slot being used in common by the first communication system used by the communication apparatus and the second communication system different from the first communication system, the second communication system using the same communication procedure as the first communication system. Thus, the number of systems which can coexist is not governed by the number of time slots. Accordingly, the numerical restriction of systems which can coexist can be relaxed.

It is desirable that the time slot be secured by transmitting a predetermined signal to an area for reserving the time slot and transmitting a beacon signal to the time slot reserved by the transmission of the predetermined signal. Consequently, a collision between reservations can be avoided as much as possible.

In this case, the beacon signals may be placed at heads of respective areas of the secured time slot by the first and second communication systems when the first and second communication systems exist in the secured time slot, or the beacon signals may be placed in a concentrated manner at a head of the secured time slot by the first and second communication systems when the first and second communication systems exist in the secured time slot.

It is desirable that the communication apparatus further includes: a means for retrieving a different time slot secured by the second communication system when the first and second communication systems do not coexist in the secured time slot; and a means for securing the different time slot and releasing the secured time slot at present when the different time slot is retrieved. Consequently, it becomes possible for more systems to coexist.

It is desirable that the communication apparatus further includes: a means for retrieving a different time slot by the second communication system when the first and second communication systems exist in the secured time slot; and a means for switching a reservation from the secured time slot at present to the different time slot when the different time slot is retrieved. Consequently, one system can easily secure a wider communication area, leading to an improvement in communication quality.

According to another embodiment, there is provided a communication method including: performing data communication using a bandwidth reservation type transmission area constituted by a plurality of time-divided time slots via a power line to which an alternating-current voltage is supplied; securing a vacant time slot out of the plurality of time-divided time slots; and securing a time slot out of the plurality of time-divided time slots when incapable of securing the vacant time slot, the secured time slot being used in common by a first communication system used by a communication apparatus and a second communication system different from the first communication system, the second communication system using the same communication procedure as the first communication system.

In the embodiment, a time slot is secured out of the plurality of time-divided time slots when incapable of securing the vacant time slot, the secured time slot being used in common by the first communication system used by the communication apparatus and the second communication system different from the first communication system, the second communication system using the same communication procedure as the first communication system. Thus, the numerical restriction of systems which can coexist can be relaxed.

It is desirable that the time slot is secured by transmitting a predetermined signal to an area for reserving the time slot and transmitting a beacon signal to the time slot reserved by the transmission of the predetermined signal. Consequently, a collision between reservations can be avoided as much as possible.

In this case, the beacon signals may be placed at heads of respective areas of the secured time slot by the first and second communication systems when the first and second communication systems exist in the secured time slot, or the beacon signals may be placed in a concentrated manner at a head of the secured time slot by the first and second communication systems when the first and second communication systems exist in the secured time slot.

It is desirable that the communication method further includes: retrieving a different time slot secured by the second communication system when the first and second communication systems do not coexist in the secured time slot; and securing the different time slot and releasing the secured time slot at present when the different time slot is retrieved. Consequently, it becomes possible for more systems to coexist.

It is desirable that the communication method further includes: retrieving a different time slot by the second communication system when the first and second communication systems exist in the secured time slot; and switching a reservation from the secured time slot at present to the different time slot when the different time slot is retrieved. Consequently, one system can easily secure a wider communication area, leading to an improvement in communication quality.

As described above, according to the embodiments, the number of systems which can coexist is not governed by the number of time slots, so that the numerical restriction of systems which can coexist can be relaxed.

Additional features and advantages are described herein, and will be apparent from the following Detailed Description and the figures.

DETAILED DESCRIPTION

An Embodiment will be described below based on the drawings.
(Constitution of Communication Apparatus)

Figure 1:
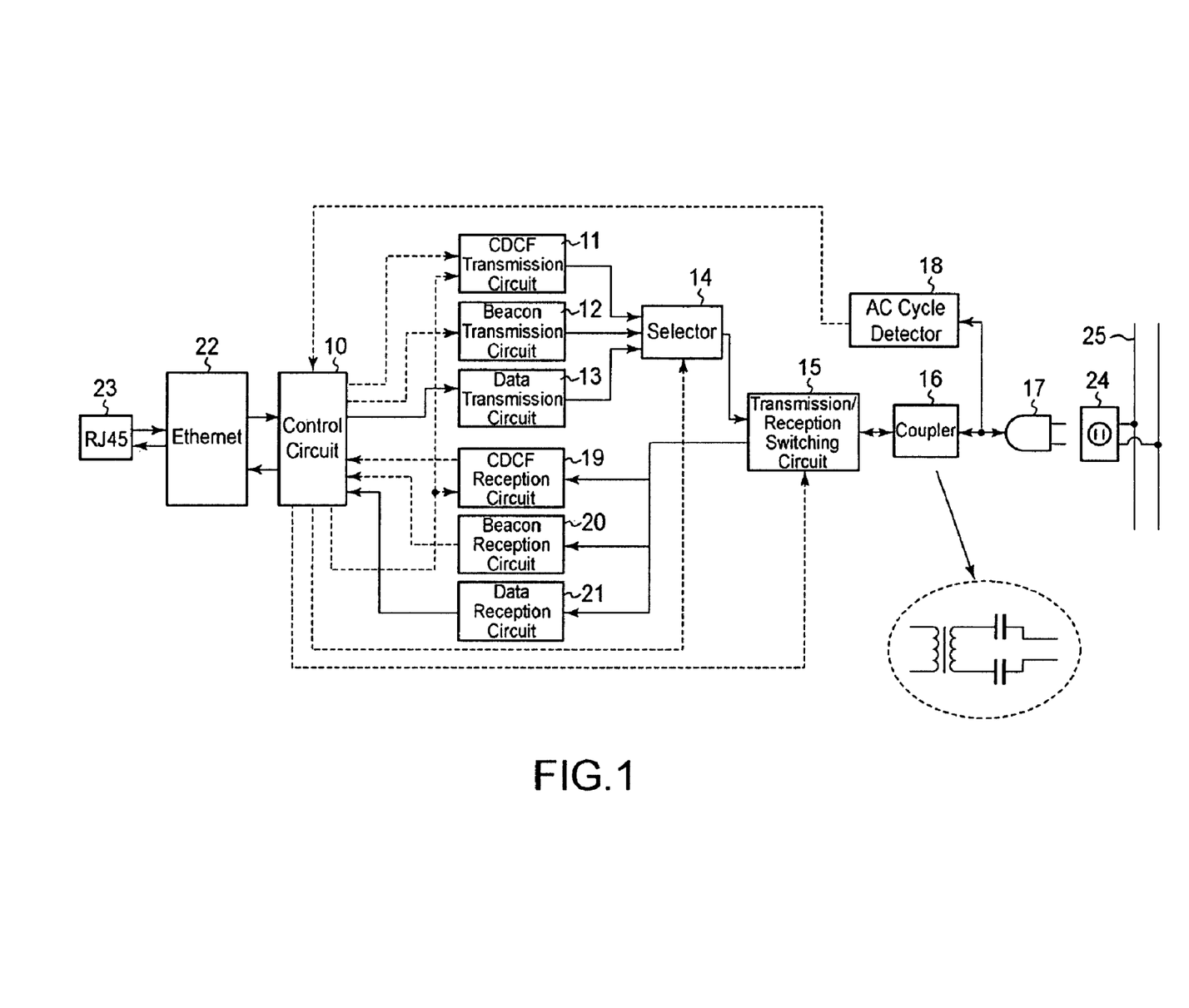
FIG. 1 is a block diagram showing the constitution of a communication apparatus according to an embodiment.

FIG. 1 is a block diagram showing the constitution of a communication apparatus according to an embodiment.

As shown in FIG. 1, a communication apparatus 1 is an apparatus, for example, called a power line communication (PLC) modem, which performs communication using an ordinary household power line (electric light line), uses a band between 2 MHz and 30 MHz as a communication band, and uses, for example, OFDM (Orthogonal Frequency Division Multiplexing) as a modulation procedure.

The communication apparatus 1 includes a control circuit 10, a CDCF transmission circuit 11, a Beacon transmission circuit 12, a data transmission circuit 13, a selector 14, a transmission/reception switching circuit 15, a coupler 16, an AC plug 17, an AC cycle detector 18, a CDCF reception circuit 19, a Beacon reception circuit 20, a data reception circuit 21, an Ethernet (registered trademark) circuit 22, and an RJ45 connector 23.

The control circuit 10 has a function of performing the designation of a CDCF transmission timing, a CDCF reception timing, and a CDCF signal type, transmission instruction of a CDCF signal, transmission instruction of a Beacon signal, data transmission processing, acquisition of received CDCF information, acquisition of received Beacon information, data reception processing, and so on.

The control circuit 10 receives a synchronizing timing from the AC cycle detector 18. This timing becomes a criterion for the CDCF transmission timing and the CDCF reception timing.

The control circuit 10 instructs the CDCF transmission circuit 11 about the type and timing of the CDCF signal based on the above synchronizing timing. The CDCF transmission circuit 11 transmits the CDCF signal to the selector 14 in accordance with this instruction.

The Beacon transmission circuit 12 transmits the Beacon signal to the selector 14 at a timing instructed by the control circuit 10.

The data transmission circuit 13 generates a transmission signal from transmission data received from the control circuit 10, (adds an error-correcting code to the transmission data, and performs modulation), and transmits the transmission signal to the selector 14 at a predetermined timing.

The selector 14 selects from among outputs of the CDCF transmission circuit 11, the Beacon transmission circuit 12, and the data transmission circuit 13 based on the instruction of the control circuit 10 and outputs a selected signal to the transmission/reception switching circuit 15.

The transmission/reception switching circuit 15 is a circuit for switching between transmission and reception, and based on the instruction of the control circuit 10, outputs the output of the selector 14 to the coupler 16 at the time of transmission and outputs a signal from the coupler to the CDCF reception circuit 19, the Beacon reception circuit 20, and the data reception circuit 21 at the time of reception.

The coupler 16 is a circuit which cuts off an alternating-current power source and transmits only signals. The output of the transmission/reception switching circuit 15 is outputted to the AC plug 17. A signal from the AC plug 17 is outputted to the transmission/reception switching circuit 15. At this time, an alternating-current power source from the AC plug 17 is cut off.

The AC plug 17 is connected to an AC outlet 24, transmits the transmission signal outputted from the coupler 16 to an electric light line 25, and transmits a signal on the electric light line 25 to the coupler 16 and the AC cycle detector 18.

The AC cycle detector 18 detects a zero-cross (0V) timing from the signal transmitted from the AC plug 17. The detected timing is transmitted to the control circuit 10.

The CDCF reception circuit 19 detects the CDCF signal from the output of the transmission/reception switching circuit 15 and transmits information on this detection to the control circuit 10. Which CDCF signal is detected is determined based on the instruction from the control circuit 10.

The Beacon reception circuit 20 detects the Beacon signal from the output of the transmission/reception switching circuit 15 and transmits information on this detection to the control circuit 10.

The data reception circuit 21 performs data reception (modulation, error correction) from the output of the transmission/reception switching circuit 15, and outputs reception data to the control circuit 10.

The control circuit 10 transmits the transmission data to the data transmission circuit 13 and receives the reception data from the data reception circuit 21. In the case of retransmission control, it is confirmed from ACK information in the reception data whether the transmission data is correctly received, and unreceived data is retransmitted (the data is transmitted again to the data transmission circuit 13).

Data not addressed to this apparatus out of data received by the control circuit is transmitted to the Ethernet (registered trademark) circuit 22. Here, the description is given taking Ethernet (registered trademark) as an example, but, other interfaces such as UBS and PCI are, of course, suitable. The control circuit 10 receives the transmission data from another apparatus from the Ethernet (registered trademark) circuit 22. The RJ45 connector 23 is connected to the Ethernet (registered trademark) circuit 22.

(Constitutional Example of TDM Unit)

Figure 2:
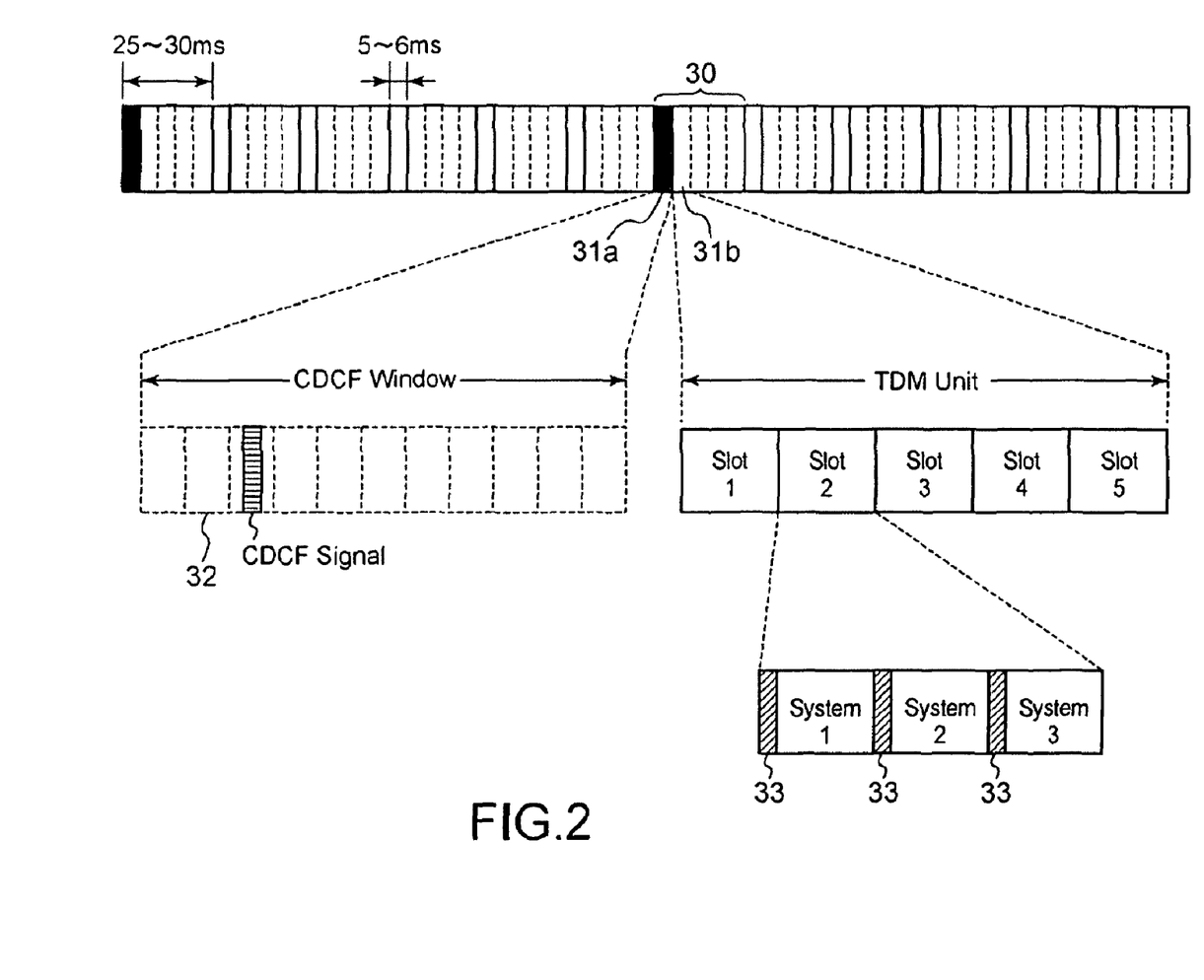
FIG. 2 is a diagram showing the constitution of a TDM unit according to the embodiment.

FIG. 2 is a diagram showing the constitution of a TDM unit according to this embodiment.

As shown in FIG. 2, one TDM unit group 30 is constituted by five TDM units.

A first TDM unit 31a out of the five TDM units is a best-effort data transmission area, and remaining four TDM units 31b are bandwidth reservation type data transmission areas.

In a first TDM unit 31a of a first TDM unit group 30 of n TDM unit groups 30, a CDCF window is placed. The CDCF window is divided into a plurality of fields 32, and the CDCF signal is transmitted into each field 32. The role of the CDCF signal differs according to which field 32 the CDCF signal is transmitted to, and, for example, refers to a notice of bandwidth reservation information, a bandwidth reservation request, a resynchronization request, and so on. In the example of FIG. 2, the CDCF signal transmitted to the field 32 shown by a solid line of the CDCF window means that a "slot 2" described later is being reserved.

Figure 3:
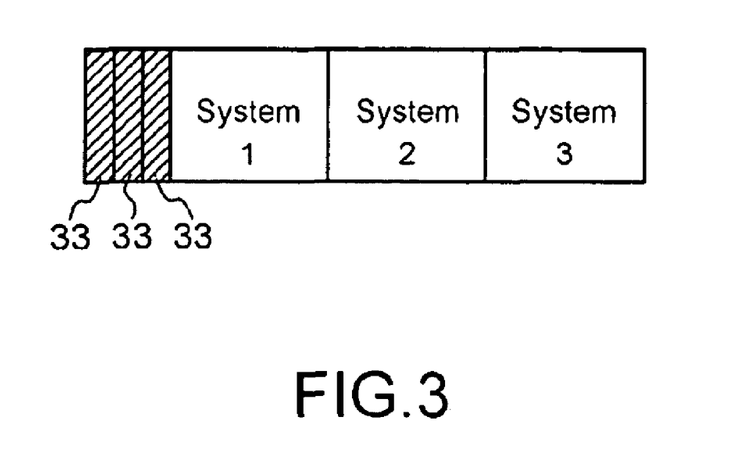
FIG. 3 is a diagram showing another arrangement example of Beacon signals.
Figure 4:
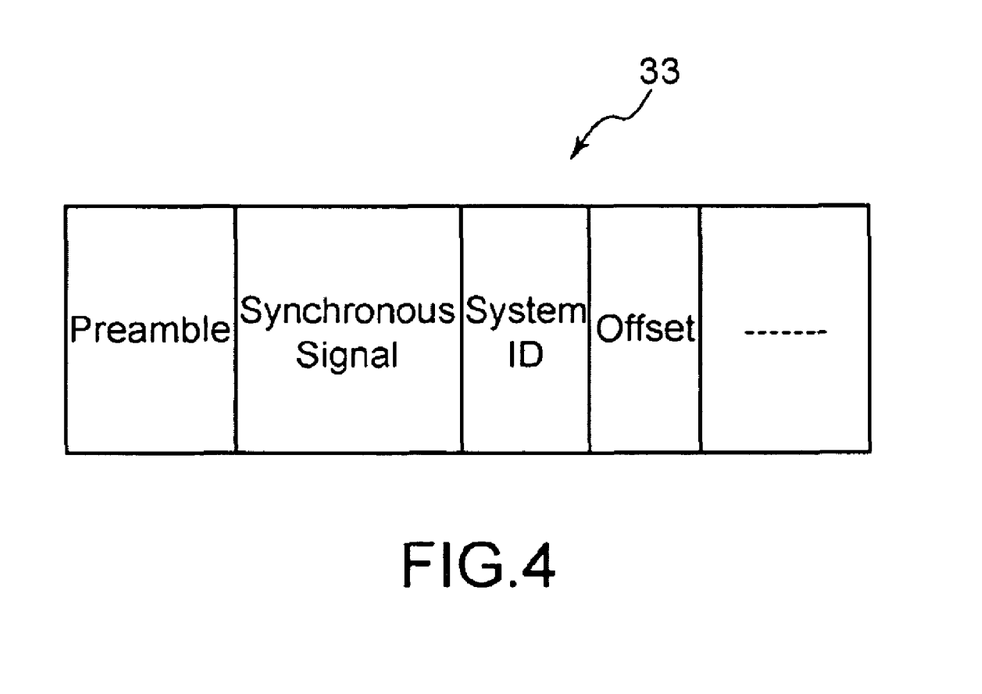
FIG. 4 is a diagram showing a constitutional example of the Beacon signal.

The four TDM units 31b after the first TDM unit 31a are each constituted, for example, by five slots, a "slot 1" to a "slot 5". In each of the "slot 1" to the "slot 5", different systems using a common communication procedure can coexist. The example shown in FIG. 2 shows a state where three different systems, a "system 1" to a "system 3", coexist in the "slot 2". A Beacon signal (beacon signal) 33 is placed at the head of each of the "system 1" to the "system 3". The "system" here means one group constituted by a plurality of communication apparatuses constituted by a Master and a plurality of slaves. One system uses one or a plurality of slots according to a necessary transmission speed. Incidentally, as shown in FIG. 3, the Beacon signals 33 may be placed in a concentrated manner at the head of each slot. FIG. 4 is a diagram showing a constitutional example of the Beacon signal 33.

Figure 5:
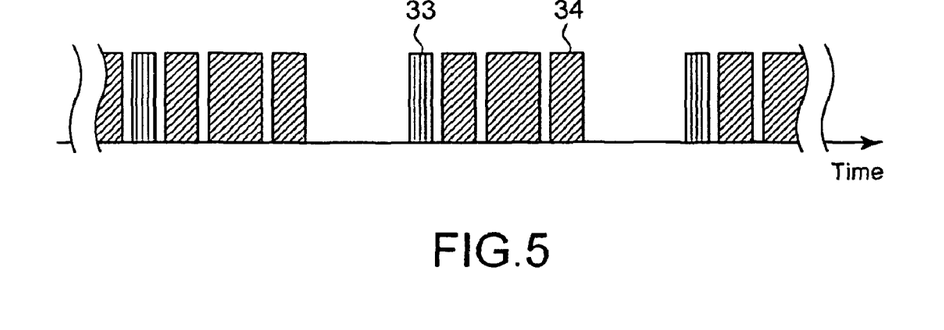
FIG. 5 is a diagram showing a relationship on a time axis between the Beacon signal and transmission data.
Figure 6:
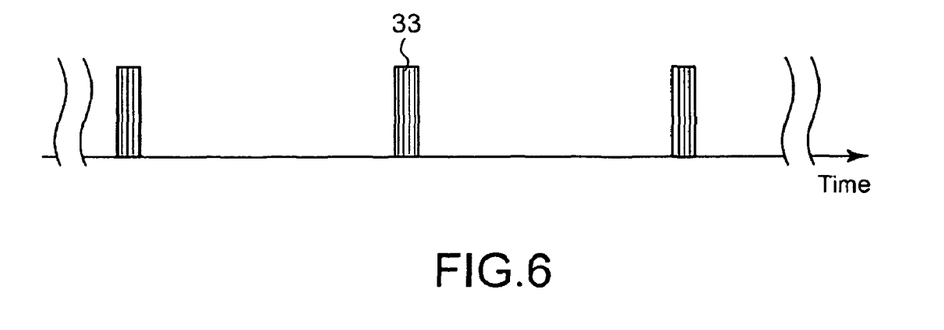
FIG. 6 is a diagram showing the state on the time axis of the Beacon signal when the transmission data is not transmitted.

As shown in FIG. 4, the Beacon signal 33 includes a preamble, a synchronous signal, a system ID to identify a system, and an offset indicating the beginning and end of the slot. Incidentally, as shown in FIG. 5, when viewed on the time axis, the Beacon signal 33 is transmitted at regular intervals, and the interval is time-divided to transmit transmission data 34. When the transmission data 34 to be transmitted does not exist, as shown in FIG. 6, only the Beacon signal 33 is repeatedly transmitted. The Beacon signal 33 is a transmission indispensable to a communication system using a TDMA procedure, and therefore cannot be stopped.

(Operation of Communication Apparatus During Activation)

Figure 7:
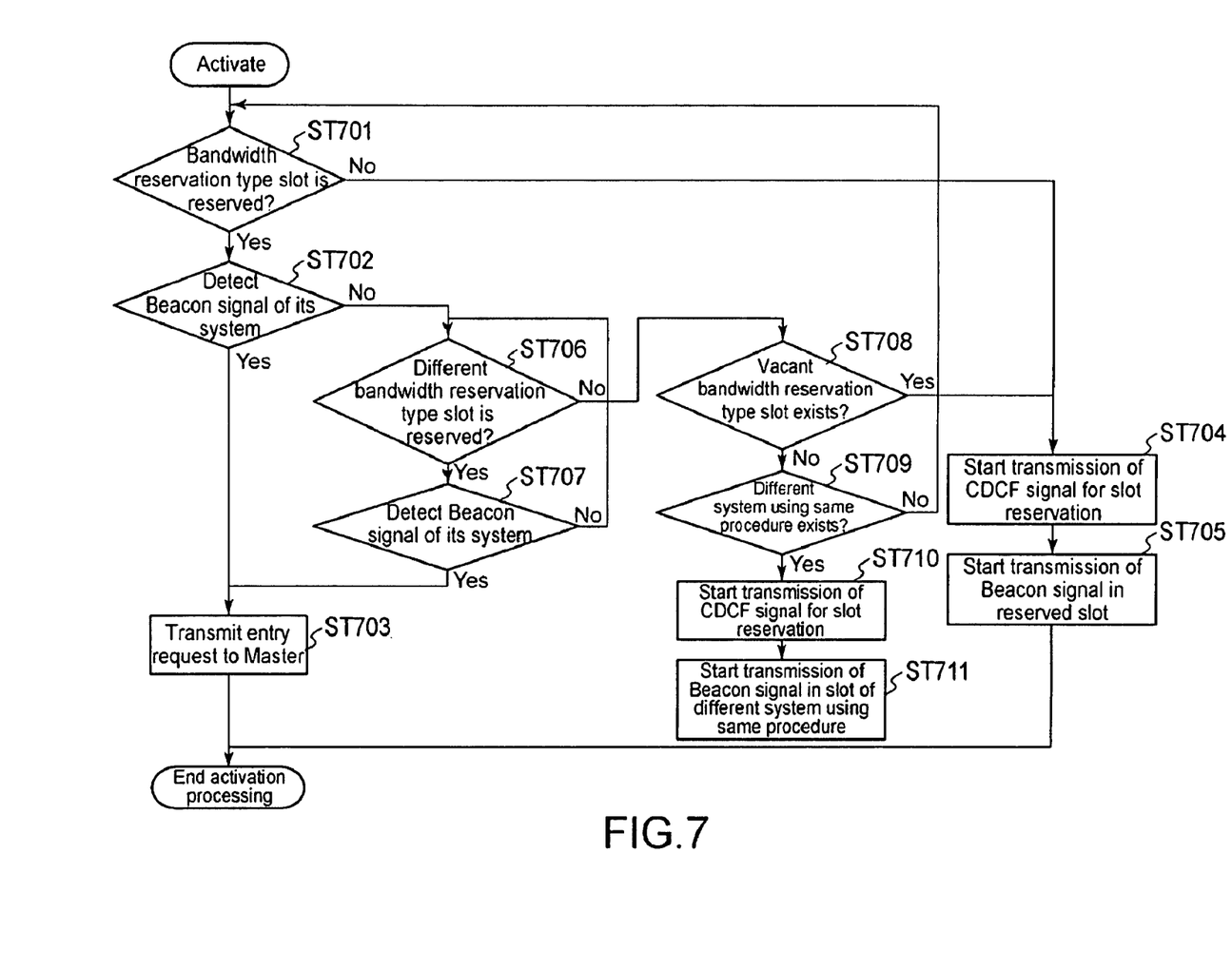
FIG. 7 is a flowchart showing the operation of the communication apparatus during activation.

FIG. 7 is a flowchart showing the operation of the communication apparatus 1 during activation.

After activated, the communication apparatus 1 confirms whether a bandwidth reservation type data communication area slot is reserved (step 701). Whether the slot is reserved is determined by whether or not the CDCF signal can be detected in the field 32 of the CDCF window corresponding to the bandwidth reservation type data communication area slot.

When the bandwidth reservation type data communication area slot is reserved, the communication apparatus 1 checks whether the Beacon signal 33 of a system to which this communication apparatus 1 belongs can be detected in the reserved slot (step 702).

When the Beacon signal 33 of the system to which this communication apparatus 1 belongs is detected in the reserved slot, the communication apparatus 1 transmits an entry request to the above Master (step 703) to enter a network, and ends activation processing.

When determining in step 701 that the bandwidth reservation type data communication area slot is not reserved, the communication apparatus 1 reserves the bandwidth reservation type data communication area slot. More specifically, the communication apparatus 1 starts transmission of the CDCF signal corresponding to the bandwidth reservation type data communication area slot to be reserved (step 704), and then starts transmission of the Beacon signal 33 in the reserved bandwidth reservation type data communication area slot (step 705). Thus, the reservation for the bandwidth reservation type data communication area slot is completed, and the activation processing is ended.

When, in step 702, the Beacon signal 33 of the system to which this communication apparatus 1 belongs cannot be detected in the reserved slot, the communication apparatus 1 confirms whether a different bandwidth reservation type data communication area slot is reserved (step 706).

When this different bandwidth reservation type data communication area slot is reserved, the communication apparatus 1 checks whether the Beacon signal 33 of the system to which this communication apparatus 1 belongs can be detected in the reserved slot (step 707). When the Beacon signal 33 cannot be detected, the communication apparatus 1 returns to step 706 and repeats the processing of confirmation of a reservation for a different slot and detection of the Beacon signal 33 (steps 706, 707).

When the Beacon signal 33 of the system to which this communication apparatus 1 belongs is detected in the reserved slot, the communication apparatus 1 transmits the entry request to the above Master to enter the network, and ends the activation processing.

When, in step 706, the bandwidth reservation type data communication area slot is not reserved, the communication apparatus 1 confirms whether a vacant (unreserved) bandwidth reservation type data communication area slot exists (step 708).

When determining in step 708 that the vacant bandwidth reservation type data communication area slot exists, the communication apparatus 1 reserves this bandwidth reservation type data communication area slot (steps 704, 705). Thus, the reservation for the bandwidth reservation type data communication area slot is completed, and the activation processing is ended.

When determining in step 708 that the vacant bandwidth reservation type data communication area slot does not exist, the communication apparatus 1 confirms whether a system using the same communication procedure exists in bandwidth reservation type data communication area slots already reserved by different systems (step 709). More specifically, in the case of the same communication procedure, the Beacon signal can be detected, but in the case of a different communication procedure, the Beacon signal cannot be detected, so that whether the system using the same communication procedure exists in the slots is confirmed by whether the Beacon signal can be detected. When the existence of such a slot cannot be confirmed, the communication apparatus 1 returns to step 701 and starts the operation from the beginning.

When, in step 709, confirming the bandwidth reservation type data communication area slot which is reserved by the different system and in which the system using the same communication procedure exists, the communication apparatus 1 starts transmission of the CDCF signal corresponding to this slot (step 710). Here, the different system using the same communication procedure already transmits the CDCF signal, but even when the different system has disappeared, this communication apparatus 1 also continues transmitting the CDCF signal to continue the reservation. Subsequently, the communication apparatus 1 starts transmission of the Beacon signal 33 in this slot (step 711). Thus, coexistence with the different system using the same communication procedure in the same slot becomes possible.

In this embodiment, by performing the above processing, if even when the bandwidth reservation type data communication area slot is occupied, the system using the same communication procedure exists, coexistence between systems using the same communication procedure in this slot becomes possible, whereby it becomes possible to accommodate systems the number of which is more than that of bandwidth reservation type data communication area slots.

(Operation of Communication Apparatus during Normal Operation)

Figure 8:
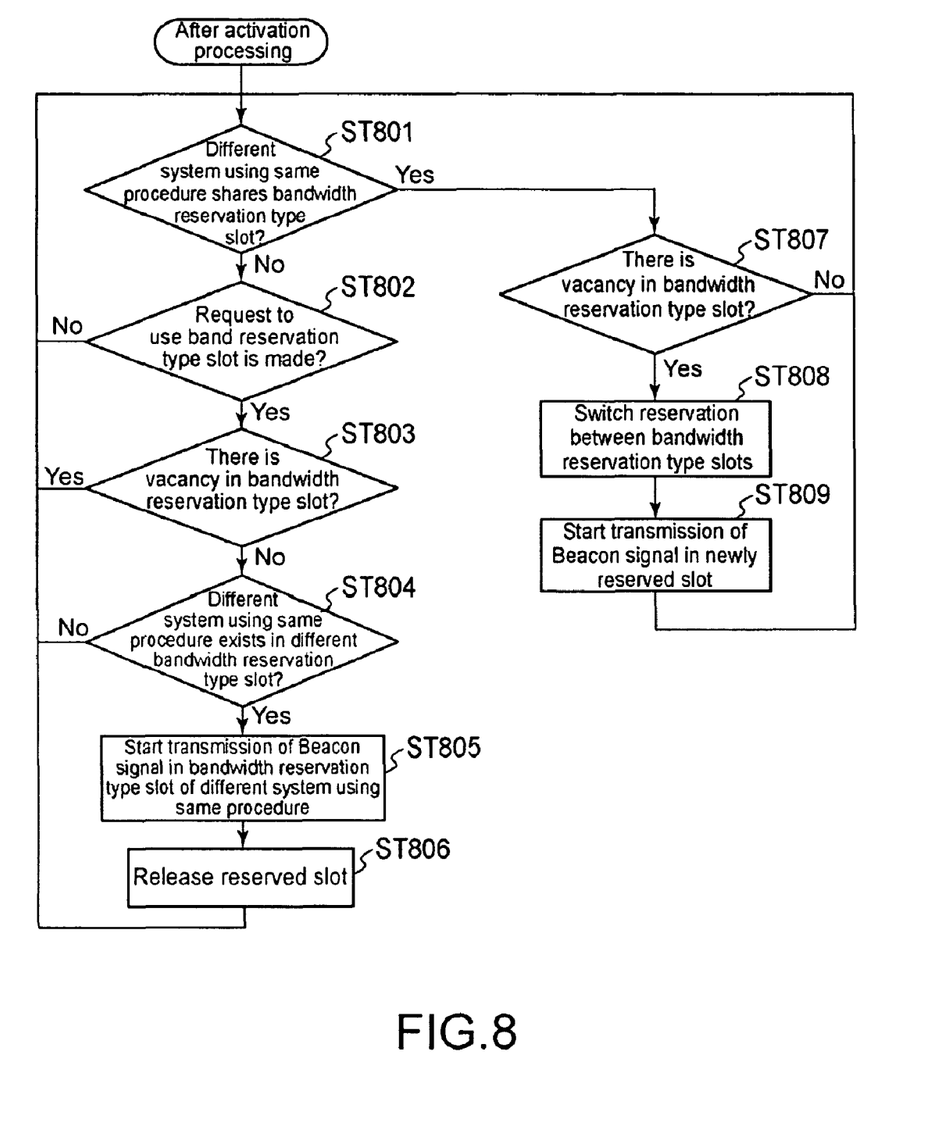
FIG. 8 is a flowchart showing the operation of the communication apparatus during a normal operation.

FIG. 8 is a flowchart showing the operation of the communication apparatus 1 during a normal operation. Here, the "operation during a normal operation" means an operation after the above activation processing in FIG. 7 is ended.

First, the communication apparatus 1 confirms whether a different communication system using the same communication procedure shares a bandwidth reservation type data communication area slot (step 801).

When determining in step 801 that the slot is not shared, the communication apparatus 1 confirms whether a different system makes a request to use this bandwidth reservation type data communication area slot (step 802). When the different system does not make the request to use this slot, the communication apparatus 1 returns to step 801.

When determining in step 802 that the different system makes the request to use this slot, the communication apparatus 1 confirms whether there is a vacancy in this slot (step 803). When there is a vacancy in this slot, the communication apparatus 1 returns to step 801. The different system (communication apparatus) which is making the new slot request here is recommended to use this vacant slot.

When determining in step 803 that there is no vacancy in this slot, the communication apparatus 1 confirms whether a different bandwidth reservation type data communication area slot reserved by a different system using the same communication procedure exists (step 804). When the different system using the same communication procedure does not reserve the different slot, the communication apparatus 1 (this system) cannot perform a coexistence operation even when moving to this slot, so that it returns to step 801 without doing anything.

When determining in step 804 that the different system using the same communication procedure reserves the different slot, the communication apparatus 1 (this system) moves to this different slot. More specifically, the communication apparatus 1 starts transmission of the CDCF signal corresponding to the destination slot and starts transmission of the Beacon signal in the destination slot (step 805). Then, it releases the slot reserved at present (stops the transmission of the CDCF signal) (step 806). This means that the slot used before the movement is yielded to the different system. This makes it possible that after the movement, a system using a different communication procedure uses this slot, whereby the coexistence of more systems becomes possible. In other words, by the above operation, different systems using the same communication procedure are put together in one slot, and when viewed as a whole, it becomes possible that more systems coexist.

When determining in step 801 that the slot is shared, the communication apparatus 1 confirms whether there is a vacancy in a different bandwidth reservation type data communication area slot (step 807). When there is no vacancy in the different slot, the communication apparatus 1 returns to step 801.

When determining in step 807 that there is a vacancy in the different slot, the communication apparatus 1 performs switching between bandwidth reservation type data communication area slots (step 808). More specifically, the communication apparatus 1 stops transmission of the CDCF signal corresponding to the slot used at present and starts transmission of the CDCF signal corresponding to the new slot. The sequence of the stop and start of transmission of the CDCF may be interchanged. Then, the communication apparatus 1 starts transmission of the Beacon signal in the newly reserved bandwidth reservation type data communication area slot (step 809).

The above operation reduces the coexistence of different systems in one and the same slot, so that it becomes easily possible that a system uses one and the same slot in a wider band, and also the communication quality improves.

It should be noted that the present application is not limited to the above embodiment and can be variously modified within the scope of its technical idea.

For example, in the above embodiment, the description is given taking OFDM as an example of a modulation procedure, but another modulation procedure such as a spread spectrum system may be, of course, used.

Moreover, in the above embodiment, the description is given with a two-phase alternating current as a premise, but even in the case of a three-phase alternating current, the present application can be applied.

It should be understood that various changes and modifications to the presently preferred embodiments described herein will be apparent to those skilled in the art. Such changes and modifications can be made without departing from the spirit and scope of the present subject matter and The invention is claimed as follows:

1. A communication apparatus, comprising:
a controller which executes a plurality of instructions to:
(a) provide data communication using a bandwidth reservation type transmission area via a power line to which an alternating-current voltage is supplied, the bandwidth reservation type transmission area including a plurality of unit groups, wherein a designated number of the unit groups each includes a plurality of different time-divided units and each of the different time-divided units includes a plurality of different time-divided time slots; and
(b) for at least one of the different time-divided units:
(i) determine whether a first one of the plurality of time-divided time slots of said at least one time-divided unit is vacant;
(ii) if the determination is that the first time slot is vacant, secure the vacant first time slot, wherein:
(A) a first communication system transmits a first beacon signal to the secured vacant first time slot; and
(B) a second communication system transmits a second beacon signal to the secured vacant first time slot; and
(iii) if the determination is that the first time slot is not vacant, secure a second, different one of the plurality of time-divided time slots of said at least one time-divided unit, wherein:
(A) the first communication system transmits a third beacon signal to the secured second, different time slot;
(B) the second communication system transmits a fourth beacon signal to the secured, different time slot;
(C) the secured second, different time slot is shared by:
(x) the first communication system used by the communication apparatus; and
(y) the second communication system; and
(D) the second communication system uses the same communication procedure as the first communication system.

2. The communication apparatus of claim 1, wherein the controller executes the plurality of instructions to: (i) transmit a predetermined signal to the at least one time-divided unit to reserve the second, different time slot, and (ii) transmit the third beacon signal to the second, different time slot reserved by the transmission of the predetermined signal to secure the second, different time slot.

3. The communication apparatus of claim 2, wherein the controller executes the plurality of instructions to cause the third and fourth beacon signals to be positioned at a head of different respective areas of the secured second, different time slot shared by the first and second communication systems.

4. The communication apparatus of claim 1, wherein the controller executes the plurality of instructions to:
(i) retrieve a different one of the time slots for the second communication system when the first and second communication systems do not share the secured second, different time slot;
(ii) release the secured second, different time slot; and
(iii) secure the retrieved different time slot.

5. The communication apparatus of claim 1, wherein the controller executes the plurality of instructions to:
(i) retrieve a different one of the time slots for the second communication system when first and second communication system share the secured time slot; and
(ii) switch a reservation from the secured time slot to the retrieved different time slot.

6. A communication apparatus comprising:
a controller which executes a plurality of instructions to operate with a first unit, a second unit and a third unit to provide data communication using a bandwidth reservation type transmission area via a power line to which an alternating-current voltage is supplied, the bandwidth reservation type transmission area including a plurality of unit groups, wherein a designated number of the unit groups each includes a plurality of different time-divided units and each of the different time-divided units includes a plurality of different time-divided time slots;
said first unit configured to determine whether a first one of the plurality of time-divided time slots of at least one of the time-divided units is vacant;
said second unit connected to the first unit, wherein if the determination is that the first time slot is vacant, the second unit being configured to secure the vacant first time slot, wherein:
(a) a first communication system transmits a first beacon signal to the secured vacant first time slot; and
(b) a second communication system transmits a second beacon signal to the secured vacant first time slot; and
said third unit connected to the first unit, wherein if the determination is that the first time slot is not vacant, the third unit being configured to secure a second, different one of the time-divided time slots, wherein:
(a) the first communication system transmits a third beacon signal to the secured second, different time slot;
(b) the second communication system transmits a fourth beacon signal to the secured, different time slot;
(c) the secured second, different time slot being shared by:
(i) the first communication system used by the communication apparatus; and
(ii) a second communication system which is different from the first communication system; and
(d) the second communication system uses the same communication procedure as the first communication system.

7. A communication method comprising:
causing a controller to execute a plurality of instructions to provide data communication using a bandwidth reservation type transmission area via a power line to which an alternating-current voltage is supplied, the bandwidth reservation type transmission area including a plurality of unit groups, wherein a designated number of the unit groups each includes a plurality of different time-divided units and each of the different time-divided units includes a plurality of different time-divided time slots;
causing a first unit to determine whether a first one of the plurality of time-divided time slots of at least one of the time-divided units is vacant;
if the determination is that the first time slot is vacant, causing a second unit to secure the vacant first time slot, wherein:
(a) a first communication system transmits a first beacon signal to the secured vacant first time slot; and
(b) a second communication system transmits a second beacon signal to the secured vacant first time slot; and if the determination is that the first time slot is not vacant, causing a third unit to secure a second, different one of the plurality of time-divided time slots, wherein:
  (a) the first communication system transmits a third beacon signal to the secured second, different time slot;
  (b) the second communication system transmits a fourth beacon signal to the secured, different time slot;
  (c) the secured second, different time slot being shared by:
    (i) the first communication system used by a communication apparatus; and
    (ii) the second communication system which is different from the first communication system; and
  (d) the second communication system uses the same communication procedure as the first communication system.

8. The communication method of claim 7, which includes causing the third unit to secure the second, different time slot by: (i) transmitting a predetermined signal to at least one of the time-divided units to reserve the second, different time slot; and (ii) transmitting the third beacon signal to the second, different time slot reserved by the transmission of the predetermined signal to secure the second, different time slot.

9. The communication method of claim 8, which includes causing the third and fourth beacon signals to be positioned at a head of different respective areas of the secured second, different time slot shared by the first and second communication systems.

10. The communication method of claim 7, which includes:
  (i) causing a different one of the time slots to be retrieved for the second communication system when the first and second communication systems do not coexist in the secured second, different time slot;
  (ii) causing the second, different time slot secured by the second communication system to be released; and
  (iii) causing the retrieved different time slot to be secured.

11. The communication method of claim 7, which includes:
  (i) causing a different one of the time slots to be retrieved by the second communication system when the first and second communication systems exist in the secured second, different time slot; and
  (ii) causing a reservation from the secured second, different time slot to switch to the retrieved different time slot.

12. A communication apparatus comprising:
a controller configured to execute a plurality of instructions, which when executed by the controller, cause the controller to:
  (a) provide data communication using a bandwidth reservation type transmission area via a power line to which an alternating-current voltage is supplied, the bandwidth reservation type transmission area including a first designated number of time slots;
  (b) enable data communication for a second, different designated number of communication systems, the second, different designated number of communication systems being greater than the first designated number of time slots;
  (c) for a first one of the time slots, cause a first communication system to transmit a first beacon signal to the first time slot; and
  (d) for a second, different one of the time slots:
    (i) cause the first communication system to transmit the first beacon signal to the second, different time slot; and
    (ii) cause a second, different communication system to transmit a second, different beacon signal to the second, different time slot, the second, wherein the second, different time slot is shared by the first communication system and the second communication system.

13. A communication apparatus comprising:
a controller which executes a plurality of instructions to:
  (a) provide data communication using a bandwidth reservation type transmission area via a power line to which an alternating-current voltage is supplied, the bandwidth reservation type transmission area including a plurality of unit groups, wherein a designated number of the unit groups each includes a plurality of different time-divided units and each of the different time-divided units includes a plurality of different time-divided time slots; and
  (b) for at least one of the different time-divided units:
    (i) determine whether a first one of the plurality of time-divided time slots of said at least one time-divided unit is vacant;
    (ii) if the determination is that the first time slot is vacant, secure the vacant first time slot; and
    (iii) if the determination is that the first time slot is not vacant:
      (A) transmit a predetermined signal to the at least one time-divided unit; and
      (B) secure a second, different one of the plurality of time-divided time slots of said at least one time-divided unit by transmitting a first beacon signal to the second, different time slot reserved by the transmission of the predetermined signal, wherein the secured second, different time slot is shared by a first communication system used by the communication apparatus and a second communication system, wherein:
        (x) the second communication system uses the same communication procedure as the first communication system;
        (y) the first communication system is associated with the first beacon signal and the second, different communication system is associated with a second, different beacon signal; and
        (z) if the secured second, different time slot is shared by the first and second communication systems, the first and second beacon signals are grouped together and positioned at a head of the secured second, different time slot shared by the first and second communication systems.

14. A communication method comprising:
causing a controller to execute a plurality of instructions to provide data communication using a bandwidth reservation type transmission area via a power line to which an alternating-current voltage is supplied, the bandwidth reservation type transmission area including a plurality of unit groups, wherein a designated number of the unit groups each includes a plurality of different time-divided units and each of the different time-divided units includes a plurality of different time-divided time slots;
causing a first unit to determine whether a first one of the plurality of time-divided time slots of at least one of the time-divided units is vacant;
if the determination is that the first time slot is vacant, causing a second unit to secure the vacant first time slot;
if the determination is that the first time slot is not vacant, causing a third unit to secure a second, different one of the plurality of time-divided time slots by (i) transmitting a predetermined signal to at least one of the time-divided units to reserve the second, different time slot; and (ii) transmitting a first beacon signal to the second, different time slot reserved by the transmission of the predetermined signal, the secured second, different time slot being shared by a first communication system used by a communication apparatus and a second communication system which is different from the first communication system, the second communication system using the same communication procedure as the first communication system, wherein the first communication system is associated with the first beacon signal and the second, different communication system is associated with a second, different beacon signal; and causing the first and second beacon signals to be grouped together and positioned at a head of the secured second, different time slot shared by the first and second communication systems.

* * * * *